(12) United States Patent
Yee et al.

(10) Patent No.: US 11,977,939 B2
(45) Date of Patent: May 7, 2024

(54) COMPACT TRANSACTION CARD WITH FOLDABLE MAGNETIC STRIPE

(71) Applicant: Capital One Services, LLC, McLean, VA (US)

(72) Inventors: Bryant Yee, Washington, DC (US); Tyler Maiman, Melville, NY (US); Viraj Chaudhary, Katy, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/110,445

(22) Filed: Feb. 16, 2023

(65) Prior Publication Data

US 2023/0196052 A1  Jun. 22, 2023

Related U.S. Application Data

(63) Continuation of application No. 17/462,618, filed on Aug. 31, 2021, now Pat. No. 11,610,091.

(51) Int. Cl.
*G06K 19/077* (2006.01)
*G06K 19/06* (2006.01)

(52) U.S. Cl.
CPC ... *G06K 19/0772* (2013.01); *G06K 19/06196* (2013.01)

(58) Field of Classification Search
CPC ............. G06K 19/083; G06K 19/0722; G06K 19/06196; G06K 19/06187; G06K 7/084; G06K 19/06206; G06K 19/04; G06K 19/06046; G06K 19/12
See application file for complete search history.

(56) References Cited

U.S. PATENT DOCUMENTS

| | | | |
|---|---|---|---|
| 7,278,584 B1 * | 10/2007 | Gandel | B42D 25/369 428/126 |
| 2007/0284435 A1 * | 12/2007 | Newbrough | G06Q 20/347 235/380 |

FOREIGN PATENT DOCUMENTS

| | | | |
|---|---|---|---|
| EP | 1018693 A2 * | 7/2000 | G06K 13/0875 |

OTHER PUBLICATIONS

Egger, "High Speed Magneto-Optical Sensor for Magnetic Stripe Readout" (Year: 2016).*

* cited by examiner

*Primary Examiner* — Thien T Mai
(74) *Attorney, Agent, or Firm* — KDW Firm PLLC

(57) ABSTRACT

Provided are compact transaction cards. In some approaches, a body of the card includes first and second sections rotatably coupled together, wherein the first and second sections define a first main side opposite a second main side, an insertion end perimeter opposite a second end perimeter, and a first side perimeter opposite a second side perimeter. The body may include a chip along the first main side, the chip being located on the first section of the body. A magnetic stripe may be provided along the second main side of the body, wherein the magnetic stripe is located on the second section, wherein the magnetic stripe extends parallel to the insertion end perimeter when the first and second sections are in a first configuration, and wherein the magnetic stripe extends perpendicular to the insertion end perimeter when the first and second sections are in a second configuration.

20 Claims, 4 Drawing Sheets

COMPACT TRANSACTION CARD WITH FOLDABLE MAGNETIC STRIPE

CROSS-REFERENCE TO RELATED APPLICATIONS

This application is a continuation of U.S. patent application Ser. No. 17/462,618, filed Aug. 31, 2021, the disclosure of which is incorporated by reference in its entirety.

FIELD

Embodiments of the present disclosure relate to transaction cards and, more particularly, to transaction cards with a foldable magnetic stripe.

BACKGROUND

Transaction cards, such as credit and debit cards, are one of the primary means for individuals to complete transactions involving data exchange. Many other forms of cards are also widely used, such as identification cards, loyalty cards, prescription cards, insurance cards, etc. Transaction cards are typically sized according to standards set by the International Organization for Standardization (ISO). This means that most transaction cards being utilized are of the same size and dimensions, typically about 2.5 inches by about 3 inches in a generally rectangular configuration. However, a transaction card having dimensions according to this standard may be relatively large.

In some instances, it may be desirable to reduce the size of transaction cards while still maintain expected functionality. It is with respect to this and other considerations that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body having a first section and a second section rotatably coupled together, wherein the first section and the second section define a first main side opposite a second main side, an insertion end perimeter opposite a second end perimeter, and a first side perimeter opposite a second side perimeter. The transaction card may further include a chip along the first main side of the body, the chip located on the first section of the body, and a magnetic stripe along the second main side of the body. The magnetic stripe may be located on the second section of the body, wherein the magnetic stripe extends parallel to the insertion end perimeter when the first section and the second section of the body are in a first configuration, and wherein the magnetic stripe extends perpendicular to the insertion end perimeter when the first section and the second section of the body are in a second configuration.

In another approach according to the disclosure, a compact transaction card may include a body comprising a first section and a second section rotatably coupled together, wherein the first section and the second section define a first main side opposite a second main side, an insertion end perimeter opposite a second end perimeter, and a first side perimeter opposite a second side perimeter. The compact transaction card may further include a chip along the first main side of the body, the chip located on the first section of the body. The compact transaction card may further include a magnetic stripe along the second main side of the body, wherein the magnetic stripe is located on the second section of the body, wherein the magnetic stripe extends parallel to the insertion end perimeter when the first section and the second section of the body are in a first configuration, and wherein the magnetic stripe extends perpendicular to the insertion end perimeter when the first section and the second section of the body are in a second configuration.

In yet another approach according to the disclosure, a compact transaction card may include a body comprising a first section and a second section rotatably coupled together, wherein the first section and the second section define a first main side opposite a second main side, an insertion end perimeter opposite a second end perimeter, and a first side perimeter opposite a second side perimeter. The compact transaction card may further include a chip along the first main side of the body, the chip located on the first section of the body. The compact transaction card may further include a magnetic stripe along the second main side of the body, wherein the magnetic stripe is located on the second section of the body, wherein the magnetic stripe extends parallel to the insertion end perimeter when the first section and the second section of the body are in a first configuration, and wherein the magnetic stripe extends perpendicular to the insertion end perimeter when the first section and the second section of the body are in a second configuration. The compact transaction card may further include a locking mechanism operable to maintain the first and second sections of the body in the second configuration.

BRIEF DESCRIPTION OF THE DRAWINGS

The accompanying drawings illustrate example approaches of the disclosure, including the practical application of the principles thereof, as follows.

Figure 1A:
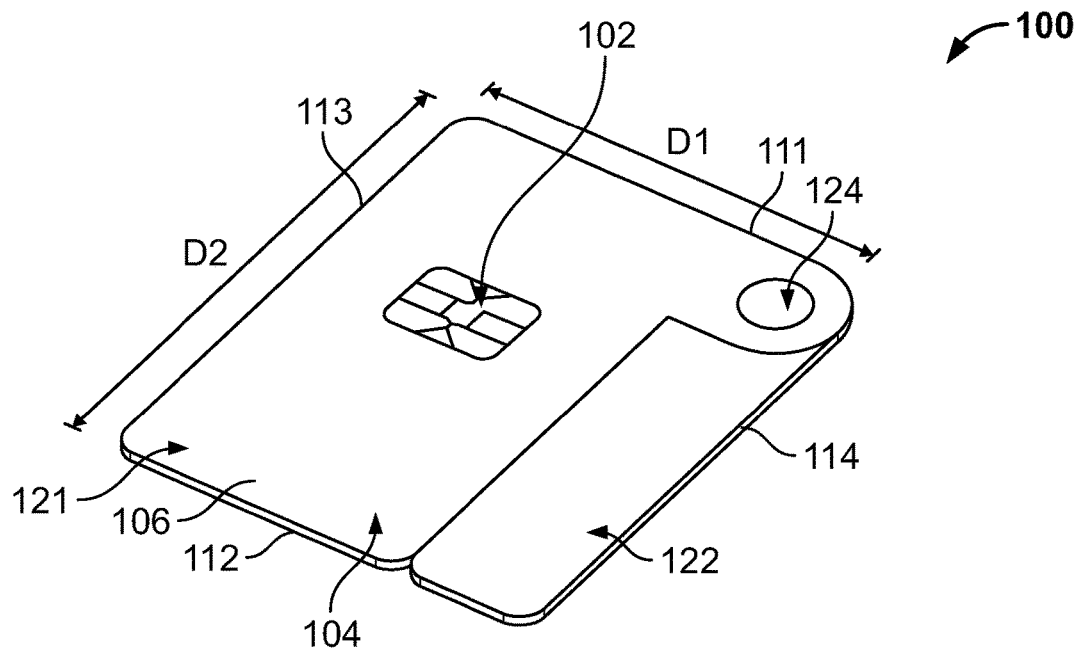
FIG. 1A is a top perspective view of a transaction card in a first configuration, in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to expandable transaction cards. When not in use, the transaction card can be folded to take up less space in a user's wallet or pocket. A body of the transaction card may include a first section and a second section rotatably coupled together, wherein an identification chip may be located on the first section of the body and a magnetic stripe may be located on the second section of the body. In some embodiments, the first and second sections of the transaction card may be joined by a locking, friction-fit, one-way joint.

Referring now to FIGS. 1A-2B, an example transaction card (hereinafter "card") 100 according to embodiments of the disclosure will be described. Transaction cards include, but are not limited to, credit cards, debit cards, gift cards, rewards cards, frequent flyer cards, merchant-specific cards, rewards cards, travel cards (e.g., a train pass, a bus pass, etc.), discount cards, insurance cards, identification cards, and driver's licenses. Described sometimes herein as contactless due to the method of communication by an identification chip 102, such as an EMV chip, the card 100 may also provide one or more functions requiring contact. For example, the card 100 may include a magnetic stripe 103 and/or a microchip connected to contacts present on an outer (e.g., back) layer of the card 100.

As shown, a body 104 of the card 100 may include a first main side 106 opposite a second main side 108. Although non-limiting, the first main side 106 may correspond to a front or top side of the card 100, while the second main side 108 may correspond to a back or bottom side of the card 100. The body 104 may be defined by an outer perimeter including a first side perimeter 111 opposite a second side perimeter 112 and an insertion end perimeter 113 opposite a second end perimeter 114. In some embodiments, a first length dimensions 'D1' of the first side perimeter 111 is less than a second length dimension 'D2' of the insertion end perimeter 113. More specifically, D1 may be between 42 mm and 44 mm when the first section 121 and the second section 122 of the body 104 are in the first configuration, and D2 may be between 53 mm and 55 mm.

Figure 1B:
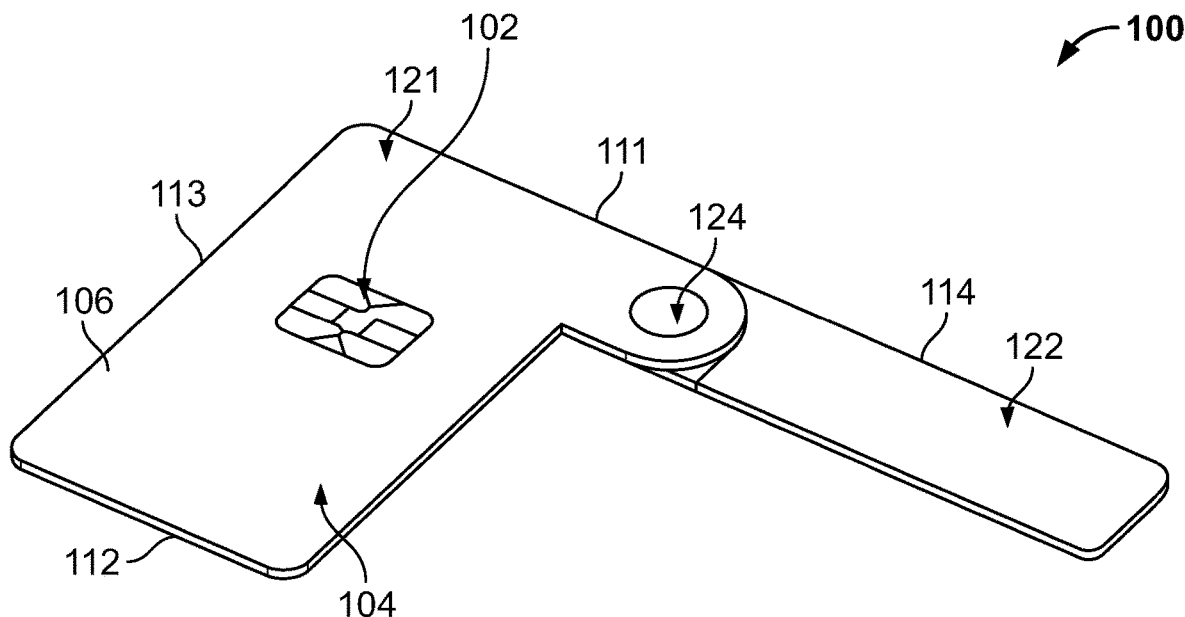
FIG. 1B is a top perspective view of the transaction card in a second configuration, in accordance with embodiments of the present disclosure.
Figure 2A:
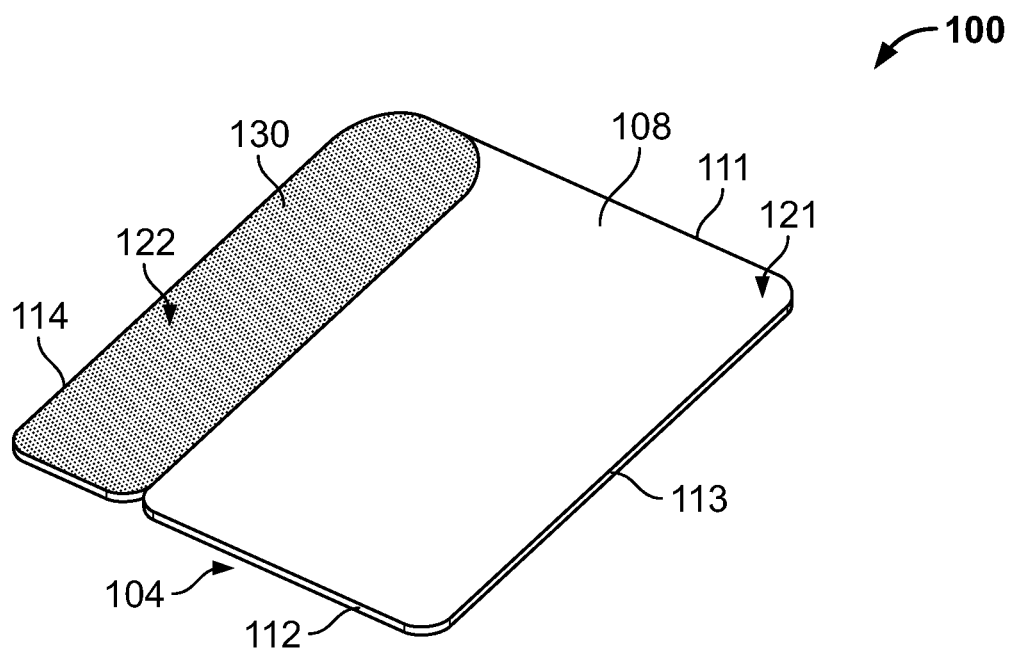
FIG. 2A is a bottom perspective view of the transaction card in the first configuration, in accordance with embodiments of the present disclosure.
Figure 2B:
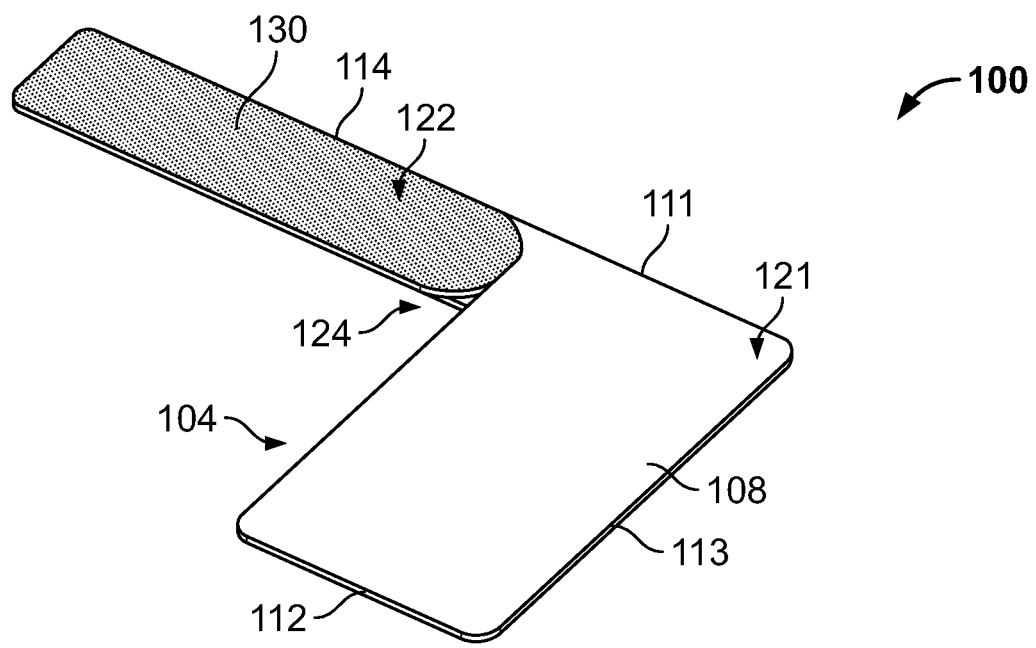
FIG. 2B is a bottom perspective view of the transaction card in the second configuration, in accordance with embodiments of the present disclosure.

As further shown, the body 104 of the card 100 may include a first section 121 and a second section 122 rotatably coupled together by a hinge 124 or other device, as will be described in greater detail below. The magnetic stripe 103 may be located on the second section 122. As shown, the magnetic stripe 103 may extend entirely across the second section 122. Due to the reduced dimensions of the body 104 of the card, the magnetic stripe 103 of the present disclosure may be truncated as compared to standard magnetic stripes extending across an entire width of the body. In some embodiments, the magnetic stripe 103 may also be present on the first section 122. The first and second sections 121, 122 of the body 104 may move between a first (e.g., closed or collapsed) configuration, as shown in FIG. 1A and FIG. 2A, and a second (e.g., open) configuration, as shown in FIG. 1B and FIG. 2B. In the first configuration, the magnetic stripe 103 may extend parallel to the insertion end perimeter 113. In the second configuration, the magnetic stripe 103 may extend perpendicular to the insertion end perimeter 113. It will be appreciated that the card 100 is designed for the insertion end perimeter 113 to be inserted into a chip reading device, and for the second section 122 to be passed through a magnetic stripe reader.

In some embodiments, the magnetic stripe 103 may be provided on the second main side 108 of the body 104, wherein the magnetic stripe 103 is part of an outer layer of the body 104. In other embodiments, the magnetic stripe 103 is part of a separate component or layer disposed atop or beneath the outer layer. The magnetic stripe 103 may contain cardholder data in accordance with standard protocols. For example, in some embodiments, the magnetic stripe 103 includes three tracks, often designated as track 1, track 2, and track 3. Many payment cards, such as credit cards or debit cards, have a magnetic stripe that includes two tracks, such as a magnetic stripe that includes tracks 1 and 2. Many card readers can read a magnetic stripe that includes three tracks, and in cases where the payment card includes a magnetic stripe with only two tracks, the card reader's ability to read a third track is unused. In non-limiting embodiments, when the magnetic stripe 103 is encoded with account data of the card 100 using two tracks, the account data of the card 100 can be encoded in tracks 1 and 2. Track 3 of the magnetic stripe 103 may be unused and devoid of valid data in such a situation. Embodiments herein are not limited in this context.

Although not shown, the second main side 108 of the card 100 may include additional identifying indicia. For example, additional identifying indicia may include a card verification value (CVV), such as a 3-digit number. Depending on the type of card, the additional identifying indicia may be present on or near a signature strip. The first main side 106 of the card 100 may also include identifying indicia, such as an account holder name and/or a card number. Although non-limiting, the card number may be a 16-digit number (e.g., four groups of four digits). In other embodiments, the card number may include a different number of digits. The identifying indicia may be printed over/on an outer layer of the body 104. However, one skilled in the art will appreciate that the printing of the identifying indicia, along with any other indicia, logos, etc., may be applied to any surface or layer of the card 100. Moreover, any suitable printing, scoring, imprinting, marking or like method is within the scope of the present disclosure.

As further shown, the identification chip 102 may be coupled (e.g., recessed or partially embedded) to the first main side 106 of the card 100. As used herein, the identification chip 102 may be any microprocessor device configured to exchange data electromagnetically, such as an EMV or RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies.

Figure 1C:
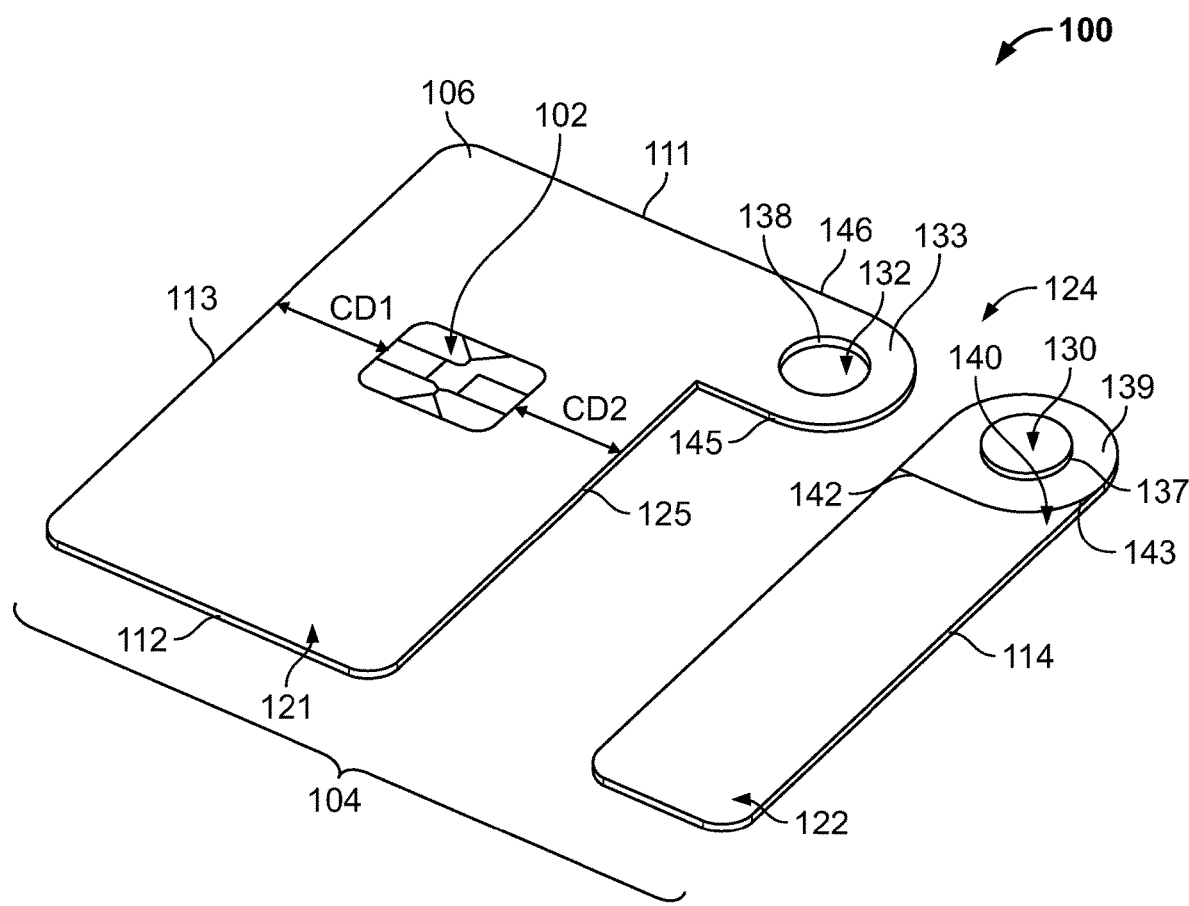
FIG. 1C is a top perspective view of the transaction card in an exploded configuration, in accordance with embodiments of the present disclosure.

In some embodiments, as best shown in FIG. 1C, the identification chip 102 may be positioned centrally between the insertion end perimeter 113 and an interior perimeter 125 of the first section 121. Said differently, a first chip distance 'CD1' between a first edge of the identification chip 102 and the insertion end perimeter 113 may be approximately equal to a second chip distance 'CD2' between a second edge of the identification chip 102 and the interior perimeter 125. In other embodiments, CD1 and CD2 are different. To enable the identification chip 102 of the card 100 to operate normally with existing chip reading devices (e.g., ATMs, kiosks, point-of-sale machines, etc.), CD1 may be selected to comply with one or more standards, such as ISO/IEC 7816.

The card 100 may be made from one or more thermoplastics including, but not limited to, polyvinyl chloride (PVC), polyester, polypropylene, polyethylene, or polycarbonate. Various other materials may also be used, including, but not limited to, soft touch plastic, metal (e.g., aluminum), fiber composite materials, resin, etc. In some embodiments, the card 100 may include additional material features, such as coverings (e.g., a silicone overmold), veneers (e.g., a wooden veneer), finishes (e.g. an oil-slick aluminum finish), or the like. In embodiments where a body 104 of the card 100 is formed of multiple layers or card substrates, each card substrate may be formed of the same material. Alternatively, one or more card substrates may be formed of a different material.

As best shown in FIG. 1C, the hinge 124 may include a tab or pin 130 insertable through an opening 132. In this embodiment, the pin 130 is part of the second section 122 and the opening 132 is through an arm 133 of the first section 121. In other embodiments, the pin 130 may be part of the first section 121 while the opening 132 is provided through the second section 122. The pin 130 may include a slope or bevel along an outer surface 137 to maintain engagement with an interior surface 138 of the opening 132.

As further shown, the arm 133 may be received within a recessed area 139 of the second section 122. The recessed area 139 may be defined, in part, by a raised wall or edge 140, wherein the raised wall 140 is curved between a first end 142 and a second end 143. When the body 104 is in the first, closed configuration, the raised wall 140 is in contact with an interior side 145 of the arm 133. As the second section 122 rotates away from the first section 121, the raised wall 140 slides from the interior side 145 to an exterior side 146 of the arm 133. When the second section 122 is oriented perpendicular to first section 121, the second end 143 of the raised wall 140 is engaged with the exterior side 146 of the arm, and further rotation of the second section 122 relative to the first section 121 is prevented by the physical contact between these two surfaces.

Figure 3A:
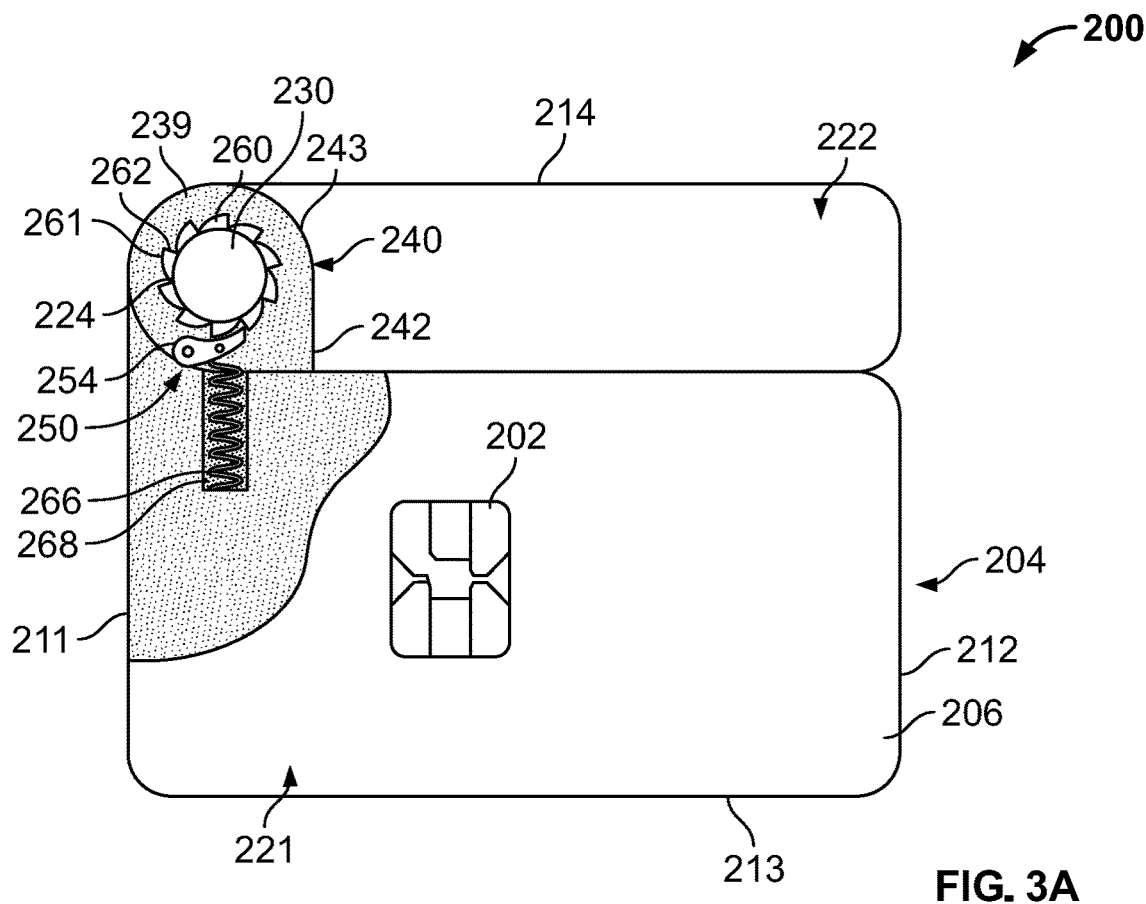
FIG. 3A is a top, partial cutaway view of a transaction card, in accordance with embodiments of the present disclosure.
Figure 3B:
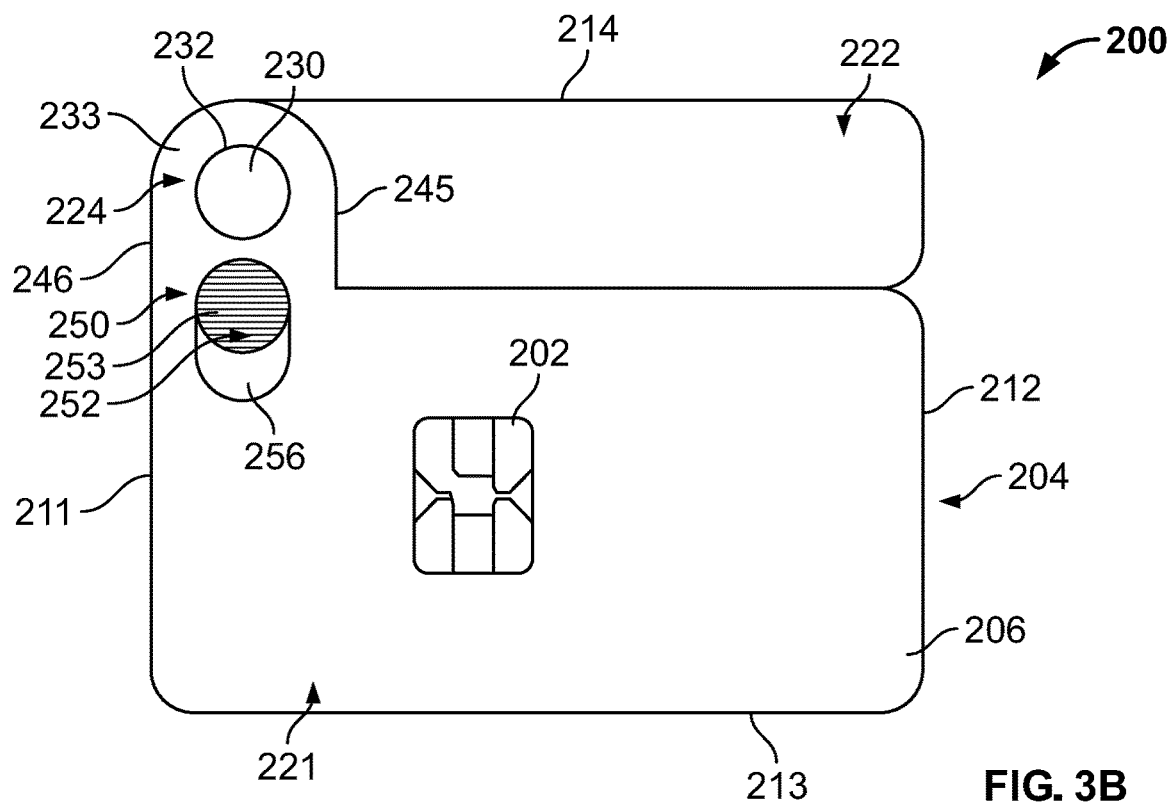
FIG. 3B is a top view of the transaction card, in accordance with embodiments of the present disclosure.

Turning now to FIGS. 3A-3B, another transaction card (hereinafter "card") 200 according to embodiments of the present disclosure will be described. The card 200 may share all or many of the same features and functions as the card 100 described herein. As such, only certain aspects of the card 200 will hereinafter be discussed for the sake of brevity.

As shown, a body 204 of the card 200 may include a first main side 206 opposite a second main side. Although non-limiting, the first main side 206 may correspond to a front or top side of the card 200, while the second main side may correspond to a back or bottom side of the card 200. Although not shown, a magnetic stripe may be present on the second main side of the card 200. The body 204 may be defined by an outer perimeter including a first side perimeter 211 opposite a second side perimeter 212 and an insertion end perimeter 213 opposite a second end perimeter 214.

As further shown, the body 204 of the card 200 may include a first section 221 and a second section 222 rotatably coupled together by a hinge 224 or other similar device. The magnetic stripe may be located on the second section 222. The first and second sections 221, 222 of the body 204 may move between a first (e.g., closed) configuration and a second (e.g., open) configuration. In the first configuration, a magnetic stripe may extend parallel to the insertion end perimeter 213. In the second configuration, the magnetic stripe may extend perpendicular to the insertion end perimeter 213.

The hinge 224 may include a tab or pin 230 of the second section 222 insertable through an opening 232 of an arm 233 of the first section 221. The pin 230 may include a slope or bevel along an outer surface to maintain engagement with an interior surface of the opening 232. The arm 233 may be received within a recessed area 239 of the second section 222. The recessed area 239 may be defined, in part, by a raised wall or edge 240, wherein the raised wall 240 is curved between a first end 242 and a second end 243. When the body 204 is in the first, closed configuration, the raised wall 240 is in contact with an interior side 245 of the arm 233. As the second section 222 rotates away from the first section 221, the raised wall 240 slides between the interior side 245 and an exterior side 246 of the arm 233. When the second section 222 is oriented perpendicular to first section 221, the second end 243 of the raised wall 240 is engaged with the exterior side 246 of the arm, and further rotation of the second section 222 relative to the first section 221 is prevented.

The card 200 may further include a locking mechanism 250 coupled to the hinge 224, the locking mechanism 250 being operable to maintain the first and second sections 221, 222 of the body 204 in the second configuration. In some embodiments, the locking mechanism 250 may include a toggle switch 252 and a locking arm 254 coupled to the toggle switch 252. Although not limited to any particular configuration, the toggle switch 252 may include a slidable tab 253 within a slot 256 of the first section 221. The tab 253 may move between a first position, as shown, and a second position to bias the locking arm 254. A top surface of the tab 253 may be planar with the first main side 206 of the body 204 to permit the body 204 to be inserted normally into an ATM or point-of-sale device. An underside of the tab 253 may be directly coupled to the locking arm 254, which may be a pawl or other similar device.

As further shown, the pin 230 may include a plurality of detents or teeth 260 each having a sloped surface 261 and an engagement surface 262, wherein the engagement surface 262 is operable to engage the locking arm 254 to restrict rotation of the pin 230. In the example shown, the teeth 260 permit rotation of the pin 230 and the second section 222 in a counter-clockwise direction and prevent rotation of the pin 230 and the second section 222 in a clockwise direction. As a result, the second section 222 may be freely opened and then locked into the second, open configuration until the toggle switch 252 is activated. In some embodiments, the locking mechanism 250 may include a spring 266 coupled to the locking arm, wherein a force from the spring 266 biases the locking arm 254 against the teeth 260 of the pin 230. When the tab 253 of the toggle switch 252 is moved away from the pin 230, the locking arm 254 rotates away from the pin 230, causing the spring 266 to compresses within a spring slot 268 of the first section 221 of the body 204. With the locking arm 254 disengaged from the pin 230, the first and second sections 221, 222 may transition from the second, open configuration to the first, closed configuration.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The term "adhesive" used herein may refer to any type of substance used for sticking objects or materials together and may be classified in a variety of ways depending on their chemistries (e.g., epoxies, polyurethanes, polyimides), their form (e.g., paste, liquid, film, pellets, tape), their type (e.g., hot melt, reactive hot melt, thermosetting, pressure sensitive, contact, etc.), or their load carrying capability (structural, semi-structural, or non-structural).

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Although non-limiting, the card 100 and the card 200 described herein may have non-standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in). Cards 100 and 200 may differ from standard cards in that the dimensions may be, for example, 42.8×53.98 mm in the closed configuration and 83.72×53.98 mm in the open configuration. Cards 100 and 200 may have a same or similar thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
a first section and a second section coupled together by a rotatable coupler, wherein the first section and the second section define a first main side opposite a second main side, an insertion end perimeter opposite a second end perimeter, and a first side perimeter opposite a second side perimeter;
a chip located on the first section;
a magnetic stripe located on the second section, wherein the magnetic stripe extends parallel to the insertion end perimeter when the first section and the second section are in a first configuration, wherein the magnetic stripe extends perpendicular to the insertion end perimeter when the first section and the second section are in a second configuration; and
a locking mechanism coupled to the rotatable coupler, the locking mechanism operable to maintain the first and second sections in the second configuration, the locking mechanism comprises a locking arm and an engagement surface that is operable to engage the locking arm to restrict movement of the first section and the second section relative to one another.

2. The transaction card of claim 1, wherein the locking mechanism further comprises a toggle switch operable to bias the locking arm away from the engagement surface to permit the first and second sections to transition from the second configuration to the first configuration.

3. The transaction card of claim 2, wherein the locking mechanism further comprises a plurality of teeth extending around a pin of the rotatable coupler, and wherein the engagement surface is located along one or more teeth of the plurality of teeth.

4. The transaction card of claim 3, wherein the locking mechanism further comprises a spring coupled to the locking arm and to the toggle switch, wherein in a first position of the toggle switch a force from the spring biases the locking arm against the plurality of teeth.

5. The transaction card of claim 1, wherein the rotatable coupler is a hinge.

6. The transaction card of claim 5, wherein the hinge comprises a pin of the second section insertable through an opening of an arm of the first section.

7. The transaction card of claim 5, wherein the hinge comprises a pin of the first section insertable through an opening of the second section.

8. The transaction card of claim 1, wherein the chip is an EMV chip.

9. The transaction card of claim 1, wherein the chip is positioned on the first section centrally between the insertion end perimeter and an interior perimeter of the first section.

10. The transaction card of claim 1, wherein a first length dimension of the first side perimeter is less than a second length dimension of the insertion end perimeter.

11. The transaction card of claim 10, wherein the first length dimension is between 42 mm and 44 mm when the first section and the second section are in the first configuration, and wherein the second length dimension of the insertion end perimeter is between 53 mm and 55 mm.

12. A foldable transaction card, comprising:
a first section and a second section coupled together by a rotatable coupler, wherein the first section and the second section define a first main side opposite a second main side, an insertion end perimeter opposite a second end perimeter, and a first side perimeter opposite a second side perimeter, wherein the second section extends parallel to the insertion end perimeter when the first section and the second section are in a first configuration, and the second section extends perpendicular to the insertion end perimeter when the first section and the second section are in a second configuration; and
a locking mechanism coupled to the rotatable coupler, the locking mechanism operable to maintain the first and second sections in the second configuration, the locking mechanism comprises a locking arm and an engagement surface that is operable to engage the locking arm to restrict movement of the first section and the second section relative to one another.

13. The foldable transaction card of claim 12, further comprising a chip located on the first section.

14. The foldable transaction card of claim 12, further comprising a magnetic stripe located on the second section.

15. The foldable transaction card of claim 12, wherein the locking mechanism further comprises a toggle switch operable to bias the locking arm away from the engagement surface to permit the first and second sections to transition from the second configuration to the first configuration.

16. The foldable transaction card of claim 15, wherein the locking mechanism further comprises a plurality of teeth extending around a pin of the rotatable coupler, and wherein the engagement surface is located along one or more teeth of the plurality of teeth.

17. The foldable transaction card of claim 16, wherein the locking mechanism further comprises a spring coupled to the locking arm and to the toggle switch, wherein in a first position of the toggle switch a force from the spring biases the locking arm against the plurality of teeth.

18. A compact transaction card, comprising:
a first section and a second section coupled together by a rotatable coupler, wherein the first section and the second section define a first main side opposite a second main side, an insertion end perimeter opposite a second end perimeter, and a first side perimeter opposite a second side perimeter,
wherein the first section comprises an arm received within a recessed area of the second section, wherein the recessed area of the second section is defined by a raised wall, and
wherein the second section extends parallel to the insertion end perimeter when the first section and the second section are in a first configuration, and the second section extends perpendicular to the insertion end perimeter when the first section and the second section are in a second configuration; and
a locking mechanism coupled to the rotatable coupler, the locking mechanism operable to maintain the first and second sections in the second configuration, the locking mechanism comprises a locking arm and an engagement surface that is operable to engage the locking arm to restrict movement of the first section and the second section relative to one another.

19. The compact transaction card of claim 18, further comprising a chip located on the first section, and a magnetic stripe located on the second section.

20. The compact transaction card of claim 18, wherein the locking mechanism further comprises a toggle switch operable to bias the locking arm away from the engagement surface to permit the first and second sections to transition from the second configuration to the first configuration.

\* \* \* \* \*